Sept. 4, 1962 H. E. MARTIN 3,052,857
LAG CIRCUIT
Filed Dec. 24, 1959
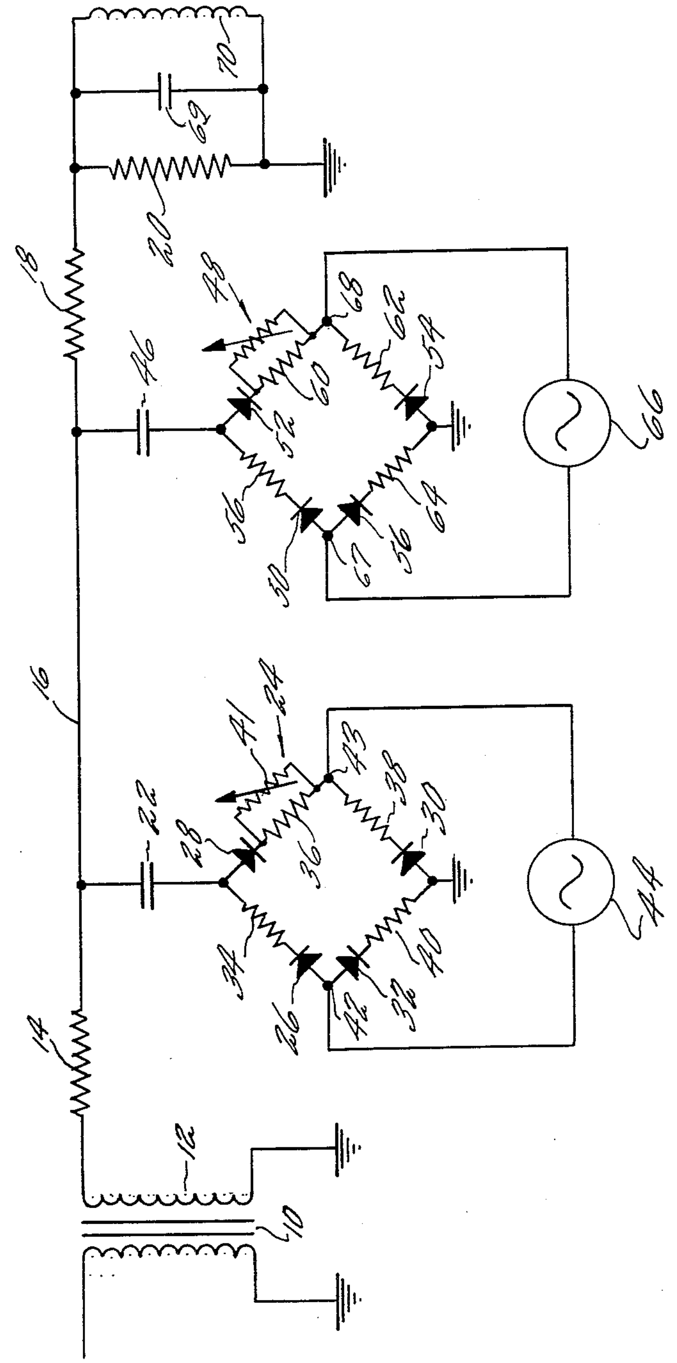
INVENTOR
HENRY E. MARTIN
BY Harris G. Luther
ATTORNEY United States Patent Office 3,052,857

Patented Sept. 4, 1962

3,052,857

LAG CIRCUIT

Henry E. Martin, Wapping, Conn., assignor to United Aircraft Corporation, East Hartford, Conn., a corporation of Delaware Filed Dec. 24, 1959, Ser. No. 861,991
1 Claim. (Cl. 333—70)

This invention relates to an A.C. compensation network, and particularly to a circuit for producing an A.C. output signal whose envelope is the envelope of the input signal after being modified through an exponential lag.

In many control systems, particularly those involving servo mechanisms, the electronic or mechanical components of the system produce changes in the phase of some of the signals fed through the system by adding leads or lags to the signals. Many times these leads and lags are useful, and may be deliberately induced, as for example, where a feedback is desired for stabilization. However, there are occasions when these changes are undesirable and must be compensated for by the addition of compensation networks to the system. The method most commonly used to compensate an alternating carrier signal is by demodulating the carrier, compensating the resulting D.C. signal through conventional differentiating or integrating circuitry, and then modulating the compensated D.C. signal on the carrier wave. This method, while satisfactory, has disadvantages in that the D.C. amplifiers necessarily included are subject to drift, and the modulation and demodulation involve considerably more circuitry than would be necessary should a more feasible method be devised for compensating the A.C. carrier directly.

One method devised for providing the desired compensation to an A.C. carrier directly, without the necessity of converting to D.C., is the notched filter method in which an A.C. filter network is designed to compensate only the small range of frequencies near the carrier frequency. This method avoids the additional modulating components, but is useful only where the carrier frequency is relatively stable. In aircraft systems, a standard A.C. carrier frequency of 400 c.p.s. is used, but it is relatively unregulated so that large variations in the carrier frequency are possible, thus making the notched filter method impractical The present invention eliminates the disadvantages of the other methods of compensation by working directly on the A.C. carrier signal and eliminating the necessity of critical regulation of the carrier frequency. In particular, the circuit of this invention essentially integrates amplitude variations impressed on an A.C. carrier and provides a lag to the signal. This is accomplished by switching a diode bridge circuit between its high and low impedance states at a rate equivalent to the frequency of the carrier wave. A pair of capacitors are charged and discharged as a function of the amplitude changes in the carrier wave, and an output results having an envelope which is that of the input signal after being modified through an exponential lag.

It is therefore an object of this invention to provide a simple and inexpensive circuit for providing an exponential lag to an A.C. carrier signal.

Another object of this invention is to provide an A.C. lag circuit which is useful where the carrier signal frequency is unstable.

A further object of this invention is to provide an A.C. compensation network which utilizes the variable impedance characteristics of a diode bridge circuit.

These and other objects will be apparent and a fuller understanding of the invention may be had by referring to the following description and claim taken in conjunction with the accompanying drawings in which:

The FIGURE is a schematic electrical representation of the lag circuit in which a diode bridge circuit performs the variable impedance function.

Referring to the figure an amplitude modulated A.C. carrier signal from the preceding stage is sensed through transformer 10 and coil 12 and conducted through resistor 14 and line 16 to a resistance divider circuit comprising resistors 18 and 20. A capacitor 22 is connected across line 16 and a diode bridge 24 is placed in series between capacitor 22 and ground. The diode bridge 24 comprises diodes 26, 28, 30 and 32 with resistors 34, 36, 38 and 40, respectively, in series with each diode. A variable resistor such as resistor 41 may be placed in parallel with one or more of the bridge resistors in order to balance the bridge. A source of alternating voltage 44 is connected to terminals 42 and 43 of bridge 24, the frequency of this voltage being the same as that of the A.C. input signal.

A similar arrangement comprising capacitor 46 and diode bridge 48 in series is connected to line 16. Diode bridge 48 comprises diodes 50, 52, 54 and 56 and resistors 58, 60, 62 and 64, respectively, in series with each diode. A source of alternating voltage 66 is similarly connected to terminals 67 and 68 of diode bridge 48. The voltage from source 66 is 180° out of phase with the voltage of source 44.

In normal operation the input signal will be in phase with the signal from either source 44 or source 66. Assuming that the input signal is in phase with source 44, diode bridge 24 will receive a positive signal at junction 42 and a negative signal at junction 43 and will be in its forward biased state during the first-half cycle of the input signal. Diodes 26, 28, 30 and 32 will be conducting, and bridge 24 will be a low impedance. The input signal will be conducted through diode bridge 24 and capacitor 22 to ground at this time and thus capacitor 22 will be charging slightly. The magnitude of the charge on capacitor 22 will be dependent on the time constant of the circuit. As the voltage from source 44 reverses in polarity diode bridge 24 will be reversed biased and will offer a high impedance to the input signal because of the reverse bias. However, since voltage 66 is 180° out of phase with source 44, diode bridge 48 will be forward biased during the negative-half cycle of the input signal. The negative part of the input signal will thus be conducted through capacitor 46 and diode bridge 48 to ground and charge capacitor 46 slightly while diode bridge 24 is reversed biased and non-conducting. The polarity of the charge on capacitor 46 will be opposite that of capacitor 22. During each subsequent cycle of the input signal, capacitors 22 and 46 will charge slowly and eventually reach a final value of charge equal in magnitude to the input signal.

If the input signal is reversed in phase 180° or voltage sources 44 and 66 are reversed so that the input signal is in phase with source 66, the charging of the capacitors will take place as described above, but the polarity of capacitors 22 and 46 will be reversed, the positive portion of the input signal being conducted through capacitor 46 and bridge 48 and the negative portion being conducted through capacitor 22 and bridge 24. The signal across output resistor 20 will always be proportional to the charge across the capacitors so that the output signal will be that of the input signal through an expotential lag, and will be full-wave.

A resonant circuit such as capacitor 69 and coil 70 may be placed across output resistor 20 to shape the output signal. The compensation to the input signal is accomplished by utilizing the variable impedance characteristics of a diode bridge. When the bridge is forward biased and conducting, it will be a low impedance and any change in the magnitude of the input signal will be conducted through the bridge circuit to ground and thus charge or discharge the capacitor; however, when, because of the biasing voltage, the diode bridge is reversed biased and non-conducting, the bridge will be a high-impedance and will thus block any incoming signal.

Although the invention has been described with a certain degree of particularity, it is understood that the present disclosure has been made only by way of example and that numerous changes in the details of construction and the combination and arrangement of parts may be resorted to without departing from the spirit and scope of the invention as hereinafter claimed.

I claim:

A compensation circuit for producing a full wave alternating output signal having an envelope which is the envelope of an alternating input signal through an exponential lag comprising means supplying an alternating input signal of varying amplitude, first and second capacitors connected in parallel to said input signal supplying means, first and second bridge circuits respectively connected between said first and second capacitors and ground, each of said bridge circuits including a diode and a fixed resistance in series in each leg of said bridge circuit and an adjustable resistance in parallel with one of said fixed resistances, means providing an alternating biasing signal of the same frequency as and in predetermined phase relationship with said input signal connected across each of said bridge circuits for varying the impedance of said bridge circuits, said biasing signal biasing said first bridge circuit to its low impedance state in phase with said input signal and conditioning said first bridge circuit to permit charging and discharging of said first series capacitor by variations in amplitude of said input signal, said biasing signal biasing said second bridge circuit to its low impedance state 180° out of phase with said input signal and conditioning said second bridge circuit to permit charging and discharging of said second series capacitor by variations in amplitude of said input signal, and output circuit means connected across said capacitors and producing an output signal proportional to the charge on said capacitors.

References Cited in the file of this patent

UNITED STATES PATENTS

| | | |
|---|---|---|
| 2,584,954 | Williams | Feb. 5, 1952 |
| 2,584,986 | Clark | Feb. 12, 1952 |
| 2,685,676 | Williams | Aug. 3, 1954 |